US008278380B2

(12) United States Patent
Luo et al.

(10) Patent No.: US 8,278,380 B2
(45) Date of Patent: Oct. 2, 2012

(54) POLYMER-ASSISTED DEPOSITION OF FILMS AND PREPARATION OF CARBON NANOTUBE ARRAYS USING THE FILMS

(75) Inventors: Hongmei Luo, Los Alamos, NM (US); Qingwen Li, Jiangsu (CN); Eve Bauer, Los Alamos, NM (US); Anthony Keiran Burrell, Los Alamso, NM (US); Thomas Mark McCleskey, Los Alamos, NM (US); Quanxi Jia, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 464 days.

(21) Appl. No.: 12/646,140

(22) Filed: Dec. 23, 2009

(65) Prior Publication Data

US 2011/0034600 A1  Feb. 10, 2011

Related U.S. Application Data

(63) Continuation-in-part of application No. 12/558,314, filed on Sep. 11, 2009, which is a continuation-in-part of application No. 10/888,868, filed on Jul. 8, 2004, now Pat. No. 7,604,839, which is a continuation-in-part of application No. 10/616,479, filed on Jul. 8, 2003, now Pat. No. 7,365,118, which is a continuation-in-part of application No. 09/629,116, filed on Jul. 31, 2000, now Pat. No. 6,589,457.

(51) Int. Cl.
*C08K 3/10* (2006.01)
(52) U.S. Cl. ......... 524/406; 524/186; 427/228; 977/847
(58) Field of Classification Search .................. 524/406
See application file for complete search history.

(56) References Cited

U.S. PATENT DOCUMENTS

| 4,081,576 | A | 3/1978 | Hensel et al. |
| 5,318,800 | A | 6/1994 | Gong et al. |
| 5,441,767 | A | 8/1995 | DeSaulniers |
| 5,540,981 | A | 7/1996 | Gallagher et al. |
| 6,255,762 | B1 | 7/2001 | Sakamaki et al. |

OTHER PUBLICATIONS

Hata et al., "Water-Assisted Highly Efficient Synthesis of Impurity-Free Single-Walled Carbon Nanotubes", Science, vol. 306, Nov. 2004, p. 1362.

*Primary Examiner* — Doris Lee
(74) *Attorney, Agent, or Firm* — Samuel L. Borkowsky

(57) ABSTRACT

Carbon nanotubes were prepared by coating a substrate with a coating solution including a suitable solvent, a soluble polymer, a metal precursor having a first metal selected from iron, nickel, cobalt, and molybdenum, and optionally a second metal selected from aluminum and magnesium, and also a binding agent that forms a complex with the first metal and a complex with the second metal. The coated substrate was exposed to a reducing atmosphere at elevated temperature, and then to a hydrocarbon in the reducing atmosphere. The result was decomposition of the polymer and formation of carbon nanotubes on the substrate. The carbon nanotubes were often in the form of an array on the substrate.

4 Claims, 2 Drawing Sheets

POLYMER-ASSISTED DEPOSITION OF FILMS AND PREPARATION OF CARBON NANOTUBE ARRAYS USING THE FILMS

RELATED APPLICATIONS

This application is a continuation-in-part of copending U.S. patent application Ser. No. 12/558,314 filed Sep. 11, 2009, which is a continuation-in-part of U.S. patent application Ser. No. 10/888,868 filed Jul. 8, 2004, now U.S. Pat. No. 7,604,839, which is a continuation-in-part of U.S. Ser. No. 10/616,479, filed Jul. 8, 2003, now U.S. Pat. No. 7,365,118, which is a continuation-in-part of U.S. Ser. No. 09/629,116, filed Jul. 31, 2000, by Li et al., now U.S. Pat. No. 6,589,457, all hereby incorporated by reference.

FIELD OF THE INVENTION

The present invention relates generally to polymer-assisted deposition of films and more particularly to a process a process of preparing carbon nanotube arrays from a film that has been prepared by polymer assisted deposition.

BACKGROUND OF THE INVENTION

Supported catalysts have been used for the growth of arrays of carbon nanotubes (CNTs). The supported catalysts typically include metal particles of Fe, Ni, Co, and Mo on a solid support such as a solid support of silicon. When the supported metal particles are exposed to a carbon source at an elevated temperature, the metal particles catalyze a decomposition of the carbon source that results in an array of aligned CNTs on the support in a direction perpendicular to the support surface (see, for example: Hata et al., Science vol. 306, p. 1362, 2004).

SUMMARY OF THE INVENTION

To achieve the foregoing and other objects, and in accordance with the purposes of the present invention, as embodied and broadly described herein, the present invention provides for a process of preparing an array of carbon nanotubes. The process includes applying a coating solution onto a substrate to form a coated substrate, the coating solution including a soluble metal precursor, a soluble polymer and a suitable solvent. The soluble metal precursor includes a first metal selected from iron, nickel, cobalt, and molybdenum. The soluble metal precursor also includes a second metal selected from magnesium and aluminum. The soluble polymer is selected from polyethyleneimine (PEI), carboxylated polyethyleneimine, other PEI derivatives, polyacrylic acid, polypyrrolidone, and poly(ethylene-maleic acid). After it is formed, the coated substrate is heated in a reducing atmosphere for time characterized as sufficient to remove the polymer. A carbon source is then added to the reducing atmosphere which results in the formation of an array of carbon nanotubes on the substrate. The array can be a single continuous array on the substrate. Alternatively, the process may result in multiple arrays on the substrate, and the coating solution may be prepared without magnesium or aluminum.

The present invention further provides a process of preparing an article of manufacture that involves applying a coating solution onto a substrate, the coating solution containing a soluble metal precursor, a soluble polymer and a suitable solvent, said soluble metal precursor including a first metal selected from iron, nickel, cobalt, and molybdenum, and a second metal selected from magnesium and aluminum. The soluble polymer is selected from polyethyleneimine, carboxylated polyethyleneimine, other PEI derivatives, polyacrylic acid, polypyrrolidone, and poly(ethylene-maleic acid).

The invention still further provides an article of manufacture including a substrate, and a coating of a metal-containing polymer layer on the substrate. The coating is a composition of matter including an aqueous, homogenous solution that includes (1) a transition metal selected from Fe, Co, and Ni, (2) another metal selected from aluminum and magnesium, (3) a soluble polymer selected from polyethyleneimine or a derivative of polyethyleneimine, and (4) a binding agent selected from ethylenediaminetetraacetic acid or a salt thereof.

The present invention further provides a composition of matter comprising a homogenous solution of:
(i) a first metal selected from iron, cobalt, nickel, and molybdenum;
(ii) a second metal selected from magnesium and aluminum,
(iii) a soluble polyethylenimine or polyethylenimine derivative,
(iv) a binding agent selected from ethylenediaminetetraacetic acid or a salt thereof, the binding agent forming a complex with the first metal and with the second metal; and
(v) a suitable solvent.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

Figure 1:
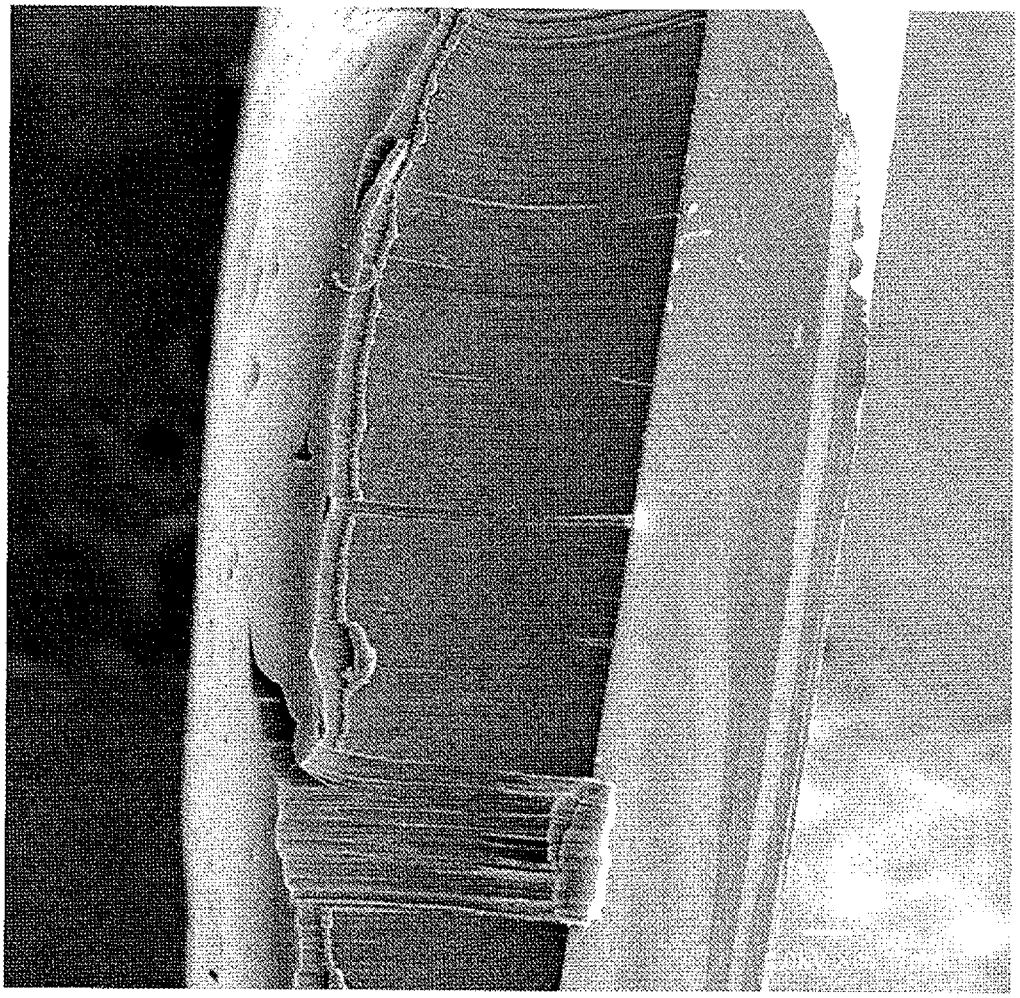
FIG. 1 shows an SEM image of a 650 micrometer-long CNT array that was prepared according to an embodiment of the invention.

The present invention is concerned with preparing metal-containing films by depositing a layer of a homogeneous solution on a substrate, optionally in an organic solvent-free process. A soluble polymer assists in the deposition of the desired metal. Thus, the process can be referred to as a polymer-assisted deposition process. Inclusion of a soluble polymer with metal precursors promotes better distribution of the materials during the deposition. The polymer can be removed by heating at sufficiently high temperatures to eliminate the polymer, leaving a metal catalyst on the support, and at even higher temperatures to decompose a carbon containing gas present and in contact with the metal catalyst, whereby an array of carbon nanotubes forms on the substrate. In one embodiment, the overall process can be an aqueous process that can be organic solvent free. The selection of precursor and atmosphere during heating promotes formation of the metal film.

The present invention is also concerned with the preparation of arrays of carbon nanotubes (CNTs) using the substrates coated with the metal-containing films.

The present invention is also concerned with the coated substrates useful for preparing these arrays.

The invention is also concerned with homogeneous metal containing solutions that can be coated onto substrates to form the coated substrates that are subsequently used for preparing arrays of CNTs.

To form an array of carbon nanotubes, the coated substrates are heated under a reducing atmosphere that is a mixture of an inert gas and a reducing gas such as hydrogen ($H_2$). To reduce a metal precursor to obtain a metal film, the reducing atmosphere can include, e.g., hydrogen or other reducing agents well known to those skilled in the art. Suitable inert gases include argon, nitrogen, and the like.

The polymer and metal-containing films are continuous films covering the substrate. They can also be readily formed as conformal films upon non-planar substrates or surfaces.

The soluble polymer used in the present process has binding properties for the metal precursors used to form the metal film and can be, e.g., polyethylenimine (PEI), a substituted PEI or PEI derivative such as a carboxylated-polyethylenimine (PEIC), a phosphorylated-polyethylenimine (PEIP), a sulfonated-polyethylenimine (PEIS), an acylated-polyethylenimine, hydroxylated water-soluble polyethylenimines and the like or a polymer such as polyacrylic acid, polypyrolidone, and poly(ethylene-maleic acid). PEI or substituted PEIs such as PEIC are generally the preferred polymers. Substituted or PEI derivatives are post modified after formation of the base polymer. Typically, the molecular weight of such polymers is greater than about 30,000. By "binding" it is meant that the polymer and the metal are bound through any of various mechanisms such as electrostatic attraction, hydrogen bonding, covalent bonding and the like.

For good processing characteristics, a precursor solution for metal films should have a suitable viscosity. In the present invention, polymer plays dual functions. In other words, a polymer is also used to assist the viscosity desired for metal film processing.

The solutions deposited on the substrates are homogeneous solutions. By "homogeneous" is meant that the solutions are not dispersions or suspensions, but are actual solutions of the polymer, metal complexes and any metal binding ligands.

The criteria on the choice of polymers are that they be soluble, undergo a clean decomposition upon heating at high temperatures, e.g., temperatures over about 250° C., and are compatible with the metal compounds. PEI decomposes completely and cleanly above 250° C. and leaves no residual carbon in the film. This feature makes PEI and derivatives thereof especially preferred polymers in the practice of the present invention. These polymers also aid in providing a viscosity to the solution which allows processing of the metal-containing precursor solution into desired configurations such as films. The desired viscosity can be achieved through controlling the concentration of the soluble polymers in the solution, and by controlling the molecular weight of the polymer. For high quality homogeneous films, polymer concentrations and the polymer ratio to metal components should be maintained at a proper balance. The rheology of the precursor solution can also be important for the morphology and quality of the final films. In order to form smooth films, the polymer solution must have suitable rheological properties so that any spin-coated film has no undesired patterns associated with polymer rheological properties.

The polymer should also have suitable interactions to metals such that no phase separation occurs during the deposition processes. The deposited polymer-metal composite films are heated at high temperatures (calcined). At temperatures above about 400° C., the polymer decomposes, and as heating is continued to temperatures of about 750° C. and above, depending on the carbon containing gas, the carbon containing gas decomposes and carbon nanotubes form on the support. For this to occur, the soluble polymer selection should have suitable decomposition characteristics, e.g., a clean decomposition under such calcination conditions so that side products are avoided.

The films prepared by the present process can include one metal, two metals which are typically a transition metal selected from iron, nickel, cobalt, and molybdenum, and either an alkaline earth metal (magnesium) or a main group metal (aluminum).

The solution used for the deposition includes the soluble polymer and the metal precursors. Metals are included through addition of appropriate metal salts. For example, aluminum can be added through an aluminum salt such as aluminum nitrate. Magnesium can be added through a magnesium salt such as a magnesium chloride, magnesium bromide, magnesium iodide, or magnesium fluoride. Other suitable salts may include metal oxalates, metal acrylates, and metal coordination complexes.

The solvent for dissolution of the soluble polymer can be, e.g., water, lower alcohols such as methanol, ethanol, propanol and the like, acetone, propylene carbonate, tetrahydrofuran, acetonitrile, acetic acids and mixtures thereof such as water and ethanol and the like. The soluble polymer used in the present invention includes binding properties for the metals or metal precursors. The polymer can help provide the necessary solubility to the respective metals and metal precursors.

The present invention employs complexes as binding agents in the process of the present invention. The metal can initially be in a metal complex such as a complex of the respective metal with a metal binding ligand or salt thereof such as ethylenediaminetetraaceticacid (EDTA) or salts thereof such as dipotassium ethylenediaminetetraaceticacid. EDTA-metal complexes are generally soluble within solutions including a soluble polymer with binding properties for the metal precursors such as PEI and the like. Besides EDTA and salts thereof, binding agents also include other carboxylic acid ligands such as ethylenediaminediaceticacid (EDDA), trans-1,2-diamino-cyclohexan-N,N,N',N'-tetraacetic acid (CDTA), ethyleneglycol-O,O'-bis-(2-aminoethyl)-N,N,N',N'-tetraacetic acid (EGTA), diethylenetriamine-pentaacetic acid (DTPA), N-(2-hydroxyethyl)-ethylenediamine-N,N',N'-triacetic acid (HEDTA), nitrilotriacetic acid (NTA), triethylentetramine-N,N,N',N'',N''',N'''-hexaacetic acid (TTHA) and the like, polypyridyl ligands such as terpyridine, 2,2'-bypyridine, 1,10-phenanthroline and the like, beta-diketone (acetylacetonate) ligands such as 2,4-propanedione and derivatives thereof, catecholate and aryl oxide or alkyl oxide ligands, macrocyclic ligands such as cyclam, cyclen, triazacyclononane and derivatives thereof, or other simple ligands such as aquo ($H_2O$) and amines ($NH_3$), i.e., $Co(NH_3)_6^{2+}$. Shiff-base ligands such as trimethylenediaminetetramethylglyoximato ligand or the salen type ligands may also be used.

The starting solution is typically maintained at ambient temperatures from about 15° C. to about 30° C., more usually from about 20° C. to about 25° C. Within those temperature ranges, the materials added to the solution are soluble.

The solutions using a polyethylenimine as the metal binding polymer are preferably filtered by ultrafiltration prior to coating them onto a substrate. This removes non-soluble components. An exemplary process in the preparation of the solutions involves filtering the precursor solution through an Amicon ultrafiltration unit containing a ultrafiltration membrane that is designed to pass materials having a molecular weight of less than certain molecular weight (e.g. about 10,000 g/mol, about 3,000 g/mol etc). Therefore, materials including but not limited to unbound metal, smaller polymer fragments and the like, etc. are passed through the ultrafiltration membrane, while the membrane retains the desired materials of a larger size. Ultrafiltration allows for removal of any unwanted salts such as cations, anions or other impurities.

The metal ratio can be controlled through appropriate addition of metal precursors to the solvent used in the deposition. Such solutions can generally have a shelf life of more than a year.

In one embodiment of the present invention, the starting solution can be deposited on a desired substrate by spray coating, dip coating, spin coating, ink jet printing, and the like. After deposition of the starting solution on a substrate, the resulting supported film is heated under a reducing atmosphere such as forming gas, which is a mixture of hydrogen ($H_2$) in an inert gas. Forming gas useful with this invention may include 1% hydrogen, 2% hydrogen, 3% hydrogen, 4% hydrogen, 5% hydrogen, 6% hydrogen, 7% hydrogen, 8% hydrogen, 9% hydrogen 10% hydrogen, or higher amount of hydrogen. Forming gas having 6% hydrogen in an inert gas such as helium or argon is commercially available. As the temperature rises, solvent that is present in the supported film evaporates. Thus, the initial stages in the heating from about 50° C. to about 150° C. for from about 15 minutes to several hours, preferably for less than one hour, result in evaporation of the solvent. After solvent evaporates, the temperature still rises until reaching temperatures where the polymer will begin to decompose. For PEI, this decomposition temperature will be about 400° C. Eventually, the polymer decomposes, as does the binding agent, leaving metal on the substrate. A carbon source is introduced after the polymer and binding agent decompose. When the carbon source gas is ethylene and the metal is iron, for example, the carbon source gas will decompose to form nanotubes on the substrate when the temperature is approximately 750° C. If the carbon source gas is ethanol and the metal is iron, the decomposition temperature is higher than 750° C. Ethanol has been shown to decompose very cleanly in the presence of an iron catalyst to form carbon nanotubes without any residual carbon besides carbon nanotubes.

The polymer is used to bind metals and metal precursors. This allows the removal of any unwanted anions or cations by filtration, e.g., through an Amicon ultrafiltration unit, and brings multiple metals together in a homogeneous manner at a molecular level. This also prevents selective precipitation of unwanted metal-containing phases as a portion of the solvent can be removed and the metals concentrated within the remaining solution. Even at the extreme of just polymer and metal, the dried solution includes only well dispersed metal atoms bound to the polymer. The present invention has extended the potential of controlling relative metal concentrations at the molecular level. This can be done in several ways.

In a first manner, a single polymer such as polyethyleneimine (PEI) can be added to a solution containing simple salts (such as nitrate) of two or more metals in the correct ratio. If the binding constant is high for both metals then they will remain in the correct ratio during filtration and concentration of the polymer.

In a second manner, the metals can be bound individually to one or more polymers and concentrated. The resulting solution can be examined by Inductively Coupled Plasma-Atomic Emission Spectroscopy ("ICP") to determine metal content and then mixed appropriately prior to spin coating. Different polymers and different solvents can be used for different metals in this system.

In a third manner, metal complexes such as a metal-EDTA complex can be prepared and mixed in the desired ratios. These complexes can then be bound to a polymer (such as polyethyleneimine) and concentrated. This is a preferred manner, as it is believed that the EDTA or some other binding agent provides some separation between the metal and promote formation of catalyst metal particles after the polymer and binding agent (EDTA) decompose during heating and prior to introduction of the carbon-containing gas, which subsequently decomposes to form the carbon nanotube array on the substrate.

The present invention is more particularly described in the following examples which are intended as illustrative only, since numerous modifications and variations will be apparent to those skilled in the art.

Examples A through M describe the preparation of solutions used in polymer-assisted deposition to form coated substrates. Polyethylenimine was obtained from BASF as a water-free, branched, polymer with an average MW of 50,000. Water was purified to 18 MΩ·cm using a Milli-Q water treatment system.

Examples AA-KK describe the preparation of a coated substrates using the solutions, and subsequent treatment of the coated substrates.

EXAMPLE A

A solution including iron and polyethylenimine was prepared as follows: An amount of 2.0 grams of ethylenediaminetetraacetic acid (EDTA) was dissolved in 40 mL water. To this solution were added 2.0 grams of iron (III) chloride ($FeCl_3$). Then 2.0 grams of polyethylenimine was added. The resulting mixture was mixed until a homogeneous solution was produced. The resulting solution was placed in an Amicon ultrafiltration unit containing an ultrafiltration membrane designed to pass materials having a molecular weight <3,000 g/mol. The solution was diluted to 200 mL and then purified by ultrafiltration. The final solution had a volume of 30 mL and a pH of 5.1. Inductively coupled plasma-atomic emission spectroscopy showed that the final solution had 11.495 mg/mL of Fe (0.209 Molar ("M") in Fe).

EXAMPLE B

A solution including magnesium and polyethylenimine was prepared as follows: An amount of 2.0 grams of EDTA was dissolved in 40 mL of water. To this solution was added 2.0 grams of magnesium chloride ($MgCl_2$). Then 2.0 grams of polyethyleneimine was added. The mixture was mixed until a homogeneous solution was obtained. The homogeneous solution was placed in an Amicon ultrafiltration unit containing an ultrafiltration membrane designed to pass materials having a molecular weight <3,000 g/mol. The solution was diluted to 200 mL and then purified by ultrafiltration. The final volume was 30 mL. Inductively coupled plasma-atomic emission spectroscopy showed that the final solution had 5.66 mg/mL of Mg (0.233 M Mg).

EXAMPLE C

A solution including aluminum and fluorinated polyethyleneimine was prepared as follows: An amount of 2.0 g of aluminum nitrate ($Al(NO_3)_3$) was dissolved in 40 mL water. Fluorinated polyethyleneimine was prepared by slowly adding an amount of 5 mL of 48% HF to an amount of 10.0 g of PEI in 40 mL water. The resulting clear solution has a pH of 7 with $F^-$ to polymer amine ration of 0.5:1. An amount of 15 mL of the fluorinated polyethyleneimine solution was added to the solution of aluminum nitrate and the contents were mixed until a homogeneous solution was produced. The homogeneous solution was placed in an Amicon ultrafiltration unit containing an ultrafiltration membrane designed to pass materials having a molecular weight <3,000 g/mol. The solution was diluted to 200 mL and then purified by ultrafiltration. The final concentration of Al was 0.201M.

EXAMPLE D

A solution including cobalt and polyethyleneimine was prepared as follows: An amount of 2.0 g of polyethyleneimine was dissolved in 40 mL water. Then an amount of 2.0 g of cobalt chloride ($CoCl_2$) was added. The final concentration of Co was 0.295 M. The resulting solution was placed in an Amicon ultrafiltration unit containing an ultrafiltration membrane designed to pass materials having a molecular weight <3,000 g/mol. The solution was diluted to 200 mL and then purified by ultrafiltration. The final solution had a volume of 30 mL. Inductively coupled plasma-atomic emission spectroscopy showed that the final solution had 17.385 mg/mL of Co (0.295 M in Co).

EXAMPLE E

A solution including nickel and polyethyleneimine was prepared as follows: An amount of 2.0 g of polyethyleneimine was dissolved in 40 mL water, and then 2.0 g nickel chloride ($NiCl_2$) was added. The resulting solution was placed in an Amicon ultrafiltration unit containing an ultrafiltration membrane designed to pass materials having a molecular weight <3,000 g/mol. The solution was diluted to 200 mL and then purified by ultrafiltration. The final solution had a volume of 30 mL. Inductively coupled plasma-atomic emission spectroscopy showed that the final solution had 22.6 mg/mL of Ni (0.385 M in Ni).

EXAMPLE F

A solution including a 5/95 molar ratio of iron and magnesium was prepared as follows: An amount of 10 microliters (μL) of the final solution from Example A was mixed with 170 μL of the final solution from Example B to yield a solution having a 5/95 molar ratio of Fe/Mg.

EXAMPLE G

A solution including a 10/90 molar ratio of iron and magnesium was prepared as follows: An amount of 20 μL of the final solution from Example A was mixed with 161.4 μL of the final solution from Example B to yield a solution having a 10/90 molar ratio of Fe/Mg.

EXAMPLE H

A solution including a 30/70 molar ratio of iron and magnesium was prepared as follows: an amount of 60 μL of the final solution from Example A was mixed with 125.4 μL of the final solution from Example B to yield a solution having a 30/70 molar ratio of Fe/Mg.

EXAMPLE I

A solution including a 50/50 molar ratio of iron and magnesium was prepared as follows: an amount of 90 μL of the final solution from Example A was mixed with 80.7 μL of the final solution from Example B to yield a solution having a 50/50 molar ratio of Fe/Mg.

EXAMPLE J

A solution including a 70/30 molar ratio of iron and magnesium was prepared as follows: an amount of 120 μL of the final solution from Example A was mixed with 46.1 μL of the final solution from Example B to yield a solution having a 70/30 molar ratio of Fe/Mg.

EXAMPLE K

A solution including a 30/70 molar ratio of iron and aluminum was prepared as follows: An amount of 50 μL of the final solution from Example A was mixed with 121.3 of the final solution from Example C to yield a solution having a 30/70 molar ratio of Fe/Al.

EXAMPLE L

A solution including a 50/50 molar ratio of cobalt and magnesium was prepared as follows: an amount of 70 μL of the final solution from Example D was mixed with 88.6 μl of the final solution from Example B to yield a solution having a solution equal in molar in Co and Mg. In other cases, Co/Mg ratio was from 50% to 100% (pure Co).

EXAMPLE M

A solution including a 50/50 molar ratio of nickel and magnesium was prepared as follows. An amount of 60 μL of the final solution from Example E was mixed with 99.1 μL of the final solution from Example B to yield a solution having a solution equal in molar in Ni and Mg. A Ni solution with no other metal besides Ni was also prepared.

EXAMPLE N

Binding of metals to PEI as EDTA complexes has been demonstrated with iron, magnesium, aluminum, cobalt, and nickel. The metals were each bound to PEI as EDTA complexes of the metals. Final metal concentrations can be readily altered by diluting with solvent (water, for example) or concentrating by rotary evaporation. The particular metal concentrations of these solutions are shown in Table 1.

TABLE 1

| Metal Salt | Polymer | EDTA | Final [metal] |
| --- | --- | --- | --- |
| 2.0 g $FeCl_3$ | 2.0 g PEI | 2.0 g | 209 mM |
| 2.0 g $MgCl_2$ | 2.0 g PEI | 2.0 g | 233 mM |
| 2.0 g $Al(NO_3)_3$ | 3.0 g fluorinated PEI | 10.0 | 201 mM |
| 2.0 g $CoCl_2$ | 2.0 g PEI | 0 | 295 mM |
| 2.0 g $NiCl_2$ | 2.0 g PEI | 0 | 385 mM |

EXAMPLE AA

The solution of Example F was used to coat a silicon substrate as follows: A silicon substrate was treated with UV light for 3 minutes. The silicon substrate had a thin silicon dioxide coating on the surface. The solution of Example F, which contains an iron and magnesium having a molar ratio of 5/95 in Fe/Mg was spin coated onto the surface of the silicon substrate at 5000 rpm for 30 seconds.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. This procedure did not result in a CNT array.

EXAMPLE BB

The solution of Example G was used to coat a silicon substrate as follows: A silicon substrate was treated with UV light for 3 minutes. The silicon substrate had a thin silicon dioxide coating on the surface. The solution of Example G, which contains a iron and magnesium having a molar ratio of 10/90 in Fe/Mg was spin coated onto the surface of the silicon substrate at 5000 rpm for 30 seconds.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. This procedure did not result in a CNT array.

EXAMPLE CC

The solution of Example H was used to coat a silicon substrate as follows: A silicon substrate was treated with UV light for 3 minutes. The silicon substrate had a thin silicon dioxide coating on the surface. The solution of Example H, which contains a iron and magnesium having a molar ratio of 30/70 in Fe/Mg was spin coated onto the surface of the silicon substrate at 5000 rpm for 30 seconds.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was a 150 micrometer-long CNT array was formed on the substrate.

EXAMPLE DD

The solution of Example I was used to coat a silicon substrate as follows: A silicon substrate was treated with UV light for 3 minutes. The silicon substrate had a thin silicon dioxide coating on the surface. The solution of Example I, which contains a iron and magnesium having an equimolar ratio of 50/50 in Fe/Mg was spin coated onto the surface of the silicon substrate at 5000 rpm for 30 seconds.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 seem of ethylene was introduced into the furnace using the forming gas as a carrier gas. The furnace temperature was controlled at 750° C. for 30 min. The result was a uniform CNT array with length of 350 micrometer.

EXAMPLE EE

The solution of Example J was used to coat a silicon substrate as follows: A silicon substrate was treated with UV light for 3 minutes. The silicon substrate had a thin silicon dioxide coating on the surface. The solution of Example J, which contains a iron and magnesium having a molar ratio of 70/30 in Fe/Mg was spin coated onto the surface of the silicon substrate at 5000 rpm for 30 seconds.

Figure 2:
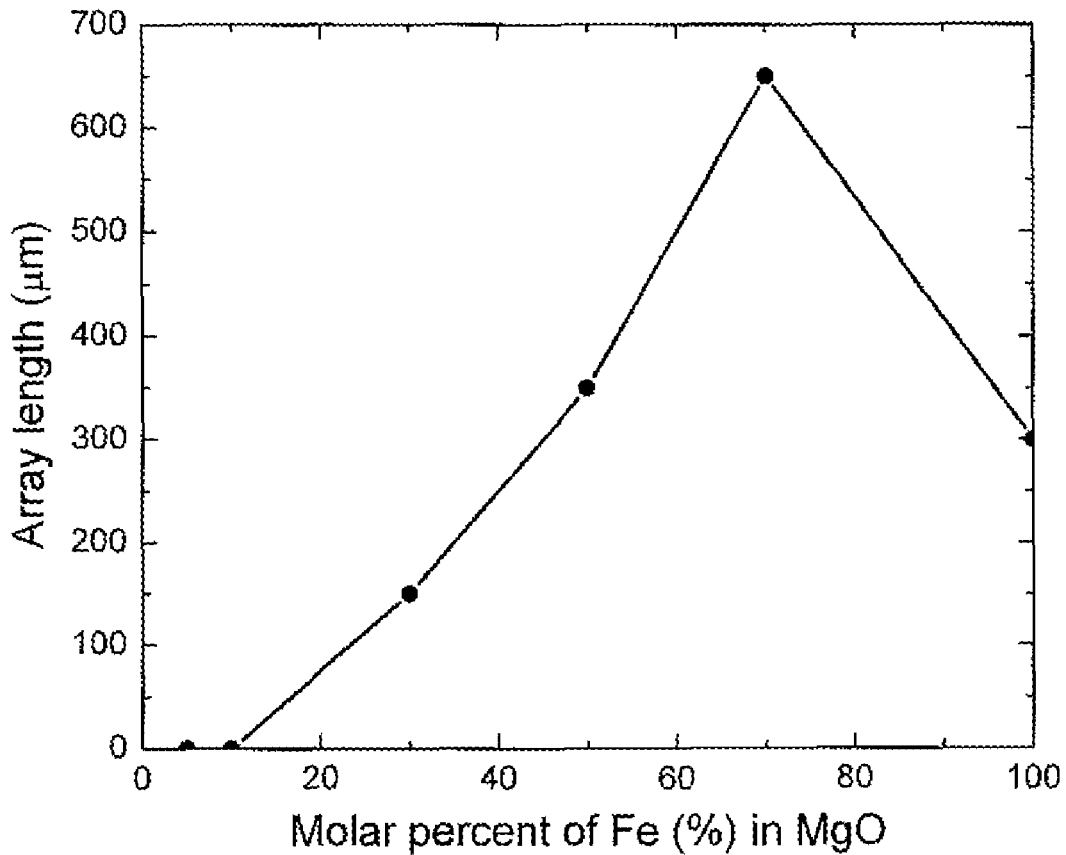
FIG. 2 shows the dependence of CNT growth rate on Fe concentration.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was a uniform 650 micrometer-long CNT array was uniformly grown on the substrate. The CNTs of the array had 2 to 7 walls and their diameters were in a range from 7~15 nanometer. FIG. 1 shows an scanning electron micrograph ("SEM") image of the array. FIG. 2 shows the dependence of CNT growth rate on Fe concentration by summarizing the results of EXAMPLES AA through EE. As FIG. 2 shows, the maximum growth under the conditions of the experiments occurs for an iron content of approximately 75%.

EXAMPLE FF

The solution of Example A was used to coat a silicon substrate as follows: A silicon substrate was treated with UV light for 3 minutes. The silicon substrate had a thin silicon dioxide coating on the surface. The solution of Example A which contained iron was spin coated onto the surface of the silicon substrate at 5000 rpm for 30 seconds. The substrate was thus coated with a film containing polyethyleneimine bonded to an iron-EDTA complex.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was that CNT arrays with 300 micrometer-long were formed on the substrate, not one continuous array on the entire substrate but patches of arrays were formed.

EXAMPLE GG

The solution of Example K was used to coat a silicon substrate as follows: A silicon substrate was treated with UV light for 3 minutes. The silicon substrate had a thin silicon dioxide coating on the surface. The solution of Example K which contained iron was spin coated onto the surface of the silicon substrate at 5000 rpm for 30 seconds. The substrate was thus coated with a film containing Fe and Al in a 30/70 Fe/Al molar ratio.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was that no CNT array was observed.

EXAMPLE HH

The solution of Example L was used to coat a silicon substrate as follows: A silicon substrate was treated with UV light for 3 minutes. The silicon substrate had a thin silicon dioxide coating on the surface. The solution of Example K which contained iron was spin coated onto the surface of the silicon substrate at 5000 rpm for 30 seconds. The substrate was thus coated with a film equimolar in Co and Mg.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was a continuous, 10 micrometer-long array formed on the substrate.

EXAMPLE II

The solution of Example D was used to coat a silicon substrate as follows: A silicon substrate was treated with UV light for 3 minutes. The silicon substrate had a thin silicon dioxide coating on the surface. The solution of Example A which contained iron was spin coated onto the surface of the silicon substrate at 5000 rpm for 30 seconds. The substrate was thus coated with a film containing polyethyleneimine bonded to cobalt.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was that CNT arrays with 50 micrometer-long were formed on some areas of the substrate. The arrays were not continuous across the entire substrate.

EXAMPLE JJ

The solution of Example M was used to coat a silicon substrate as follows: A silicon substrate was treated with UV light for 3 minutes. The silicon substrate had a thin silicon dioxide coating on the surface. The solution of Example K which contained nickel and magnesium was spin coated onto the surface of the silicon substrate at 5000 rpm for 30 seconds. The substrate was thus coated with a film equimolar in Ni and Mg.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. The result was that short CNTs were randomly formed on the substrate.

EXAMPLE KK

The solution of Example E was used to coat a silicon substrate as follows: A silicon substrate was treated with UV light for 3 minutes. The silicon substrate had a thin silicon dioxide coating on the surface. The solution of Example A which contained iron was spin coated onto the surface of the silicon substrate at 5000 rpm for 30 seconds. The substrate was thus coated with a film containing polyethyleneimine bonded to nickel.

The coated substrate was loaded inside a 2.5-centimeter diameter quartz tube furnace. The furnace was purged with forming gas (Argon+6% $H_2$) and the temperature of the furnace was increased. As soon as the temperature reached 750° C., 100 sccm of ethylene was introduced into the furnace using the forming gas as a carrier gas. The furnace temperature was controlled at 750° C. for 30 min. This procedure did not result in a CNT array. CNT arrays were not observed, but short CNTs were randomly formed on the substrates in this case.

Although the present invention has been described with reference to specific details, it is not intended that such details should be regarded as limitations upon the scope of the invention, except as and to the extent that they are included in the accompanying claims.

What is claimed is:

1. An article of manufacture comprising:
   a substrate; and,
   a uniform conformal coating of a polymer and metal containing layer thereon, said polymer selected from polyethyleneimine or a derivative thereof, said metal being a first metal selected from iron, cobalt, nickel, and molybdenum and a second metal selected from aluminum and magnesium, said polymer and metal containing layer further including a binding agent selected from ethylenediaminetetraacetic acid and derivatives and a salt thereof.

2. A composition of matter comprising a homogenous solution of:
   a first metal precursor selected from iron, cobalt, nickel, and molybdenum;
   a second metal precursor selected from magnesium and aluminum,
   a soluble polyethylenimine or polyethylenimine derivative,
   a binding agent selected from ethylenediaminetetraacetic acid or a salt thereof, the binding agent forming a complex with the first metal precursor and with the second metal precursor; and
   a suitable solvent.

3. The composition of matter of claim 2, wherein said solvent is selected from water, lower alcohols, acetone, tetrahydrofuran, propylene carbonate, acetonitrile, ethylacetate, acetic acid, and mixtures thereof.

4. The composition of matter of claim 2, wherein said solvent is water.

* * * * *